July 4, 1961 H. K. SEIKE 2,991,410

STATIC CONSTANT VOLTAGE D.C. TO D.C. CONVERTER

Filed Jan. 28, 1960 2 Sheets-Sheet 1

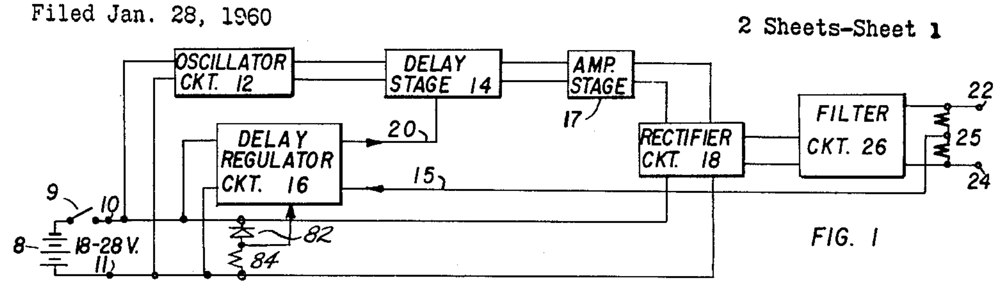

FIG. 1

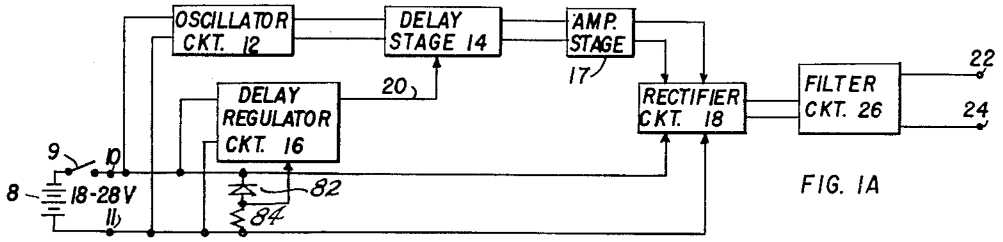

FIG. 1A

FIG. 3

OSCILLATOR OUTPUT SIGNAL ACROSS THREE WINDING TRANSFORMER 34

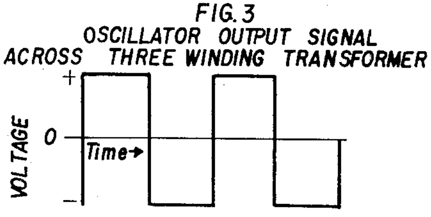

FIG. 4

DIFFERENTIATOR OUTPUT SIGNAL ACROSS TRANSFORMER 21

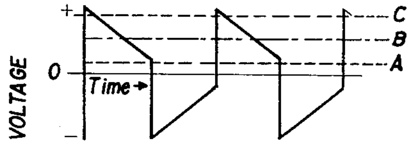

FIG. 5A

DELAY STAGE OUTPUT SIGNAL ACROSS TRANSFORMER 60 (MEDIUM DELAY)

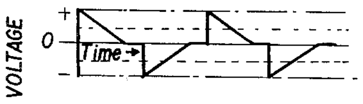

FIG. 6A

DELAY STAGE OUTPUT SIGNAL ACROSS TRANSFORMER 60 (HEAVY DELAY)

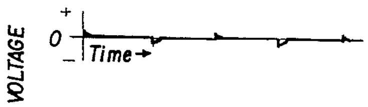

FIG. 5B

AMPLIFIER STAGE OUTPUT SIGNAL ACROSS TRANSFORMER 154 (MEDIUM DELAY)

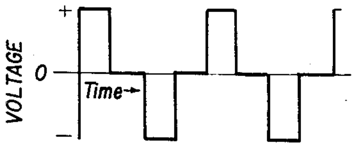

FIG. 6B

AMPLIFIER STAGE OUTPUT SIGNAL ACROSS TRANSFORMER 154 (HEAVY DELAY)

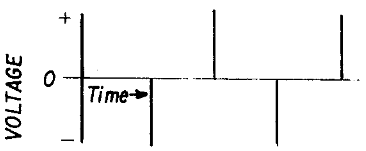

INVENTOR.
HELMUT K. SEIKE

BY Brown, Jackson, Boettcher & Dienner

ATTYS.

July 4, 1961 H. K. SEIKE 2,991,410

STATIC CONSTANT VOLTAGE D.C. TO D.C. CONVERTER

Filed Jan. 28, 1960

2 Sheets-Sheet 2

INVENTOR.
HELMUT K. SEIKE
BY [signature]
ATTYS.

2,991,410

STATIC CONSTANT VOLTAGE D.C. TO D.C. CONVERTER

Helmut K. Seike, Toledo, Ohio, assignor to Kaiser Industries Corporation, Toledo, Ohio, a corporation of Nevada Filed Jan. 28, 1960, Ser. No. 5,184
18 Claims. (Cl. 323—100)

The present invention relates to static means for providing a constant voltage direct current supply independent of changes in the voltage of the supply source and changes in the voltage of the output load.

There are many direct current electrical devices in the field which provide improved performance when energized by a direct current source which provides a constant output voltage independent of variable load and supply conditions, such arrangements including, for example, servo systems, mobile advertising and display equipment, and others. However, in certain of such uses, such as in installations on automobiles, ships, aircraft and the like, the provision of a constant value supply source frequently constitutes a difficult problem. Such problem is further complicated in many instances by the tendency for the output voltage of most known devices to vary with changes in the voltage across the load. Since such voltage variations, in turn, result in less satisfactory operation of the devices, there is a definite need in the art for a supply source which is operable to provide a constant output voltage independent of fluctuating source and load conditions, and it is a primary object of the present invention to provide a converter device which is operative in such manner.

Various attempts have been made heretofore in an effort to provide an improved type of converter unit, and each of the units inherently possesses some undesirable shortcoming. In certain types of power units now known in the field, for example, vibratory members are used as component parts of the converter unit, and such members by reason of their mechanical nature, experience reed fractures and fused contacts within a comparatively short period of use. In other known forms of power supplies such as the well known rotary converter, the failure of converter brushes and bearings, interference problems resulting from sparking at the contacts and brushes, relatively poor efficiency (in the nature of 35–40 percent) and a somewhat irritating noise factor, are commonly experienced in the field.

A further known type of power supply source which has developed in the art comprises a control circuit including thermionic control tubes. However, such arrangement, in addition to being complex and expensive, requires a warm-up interval before operation is possible, to insure that the tube filaments are at a suitable operating temperature and to give the plate voltage power supply sufficient time to produce the requisite operating potential. Such a plate voltage power supply is not necessary in equipment which does not utilize thermionic tubes. Further such arrangements require increased mounting space by reason of the increased size, and are inherently subject to damage responsive to the occurrence of vibration, shock and acceleration forces in the use thereof. It is a further object of the present invention therefore to provide a converter unit which requires no warm-up interval (and which in fact is operable within a maximum period of one second), which is composed completely of static devices to thereby eliminate the problems of weight and size which are common to prior art arrangements, while yet providing a device which is more reliable in operation when subjected to vibration, shock and acceleration forces and which may be readily energized by a relatively inexpensive low voltage supply source.

It is a particular object of the present invention to provide a converter device which is operative to maintain a constant voltage output with the occurrence of variations of the load or supply voltage of a relatively large value while yet having a relatively high efficiency of power conversion.

A feature of the present invention is the novel means which automatically protect the transistor units of the novel converter device as subjected to various adverse supply and load conditions, which conditions would effect a severe injury to the components of most known types of supply sources.

It is a particular object of the invention to provide a novel converter device which is operative to achieve a constant output with changing load and source conditions by effecting a variation of the duty cycle output of the units responsive to the detection of a variation in the supply and/or source voltage, whereby a closer regulation of the output load may be allowed.

Another feature of the invention is the manner in which the duty cycle is very accurately regulated. That is, a sloping waveform is periodically coupled to a control or delay stage and a variable reference signal is coupled to the delay stage to bias such stage to conduct at different potential input levels. In the present arrangement the incoming waveform has a short rise time to effect immediate conduction of the stage, and the time period of conduction for each signal is determined by the portion of the waveform slope which is of a sufficient value to maintain that stage conductive as biased by the reference signal. Manifestly variation of the value of the reference signal varies the effective portion of the slope and thereby the duty cycle of the delay stage.

A further feature of the invention is the manner in which the novel static converter provides a constant voltage output with a reduced power loss which results in a substantial reduction in heating through power consumption, to thereby provide improved stability of operation and longevity of the associated circuit components and the minimization of possible damage thereto. In achieving such result, the equipment is connected to operate only in response to a variation of the load or supply source below a predetermined value, and to remain in the deenergized condition whenever the voltage of the load or source is above its given value. The equipment is further operative as energized to supply only the difference in power required, whereby a substantial increase in the operating life of the inverter is achieved.

A further feature of the invention is the manner in which an open loop type regulating system is utilized, in conjunction with a closed loop regulating system, to provide very accurate control of the output voltage and avoid parasitic oscillation of the entire system.

These and other features of the present invention will become apparent with reference to the following specification, claims and drawings in which:

FIGURES 1, 1A are block diagrams of preferred embodiments of the invention;

FIGURES 3, 4, 5A, 5B, 6A and 6B are voltage vs. time diagrams of waveforms produced in the circuitry of FIGURE 2.

*General description*

Figure 2:
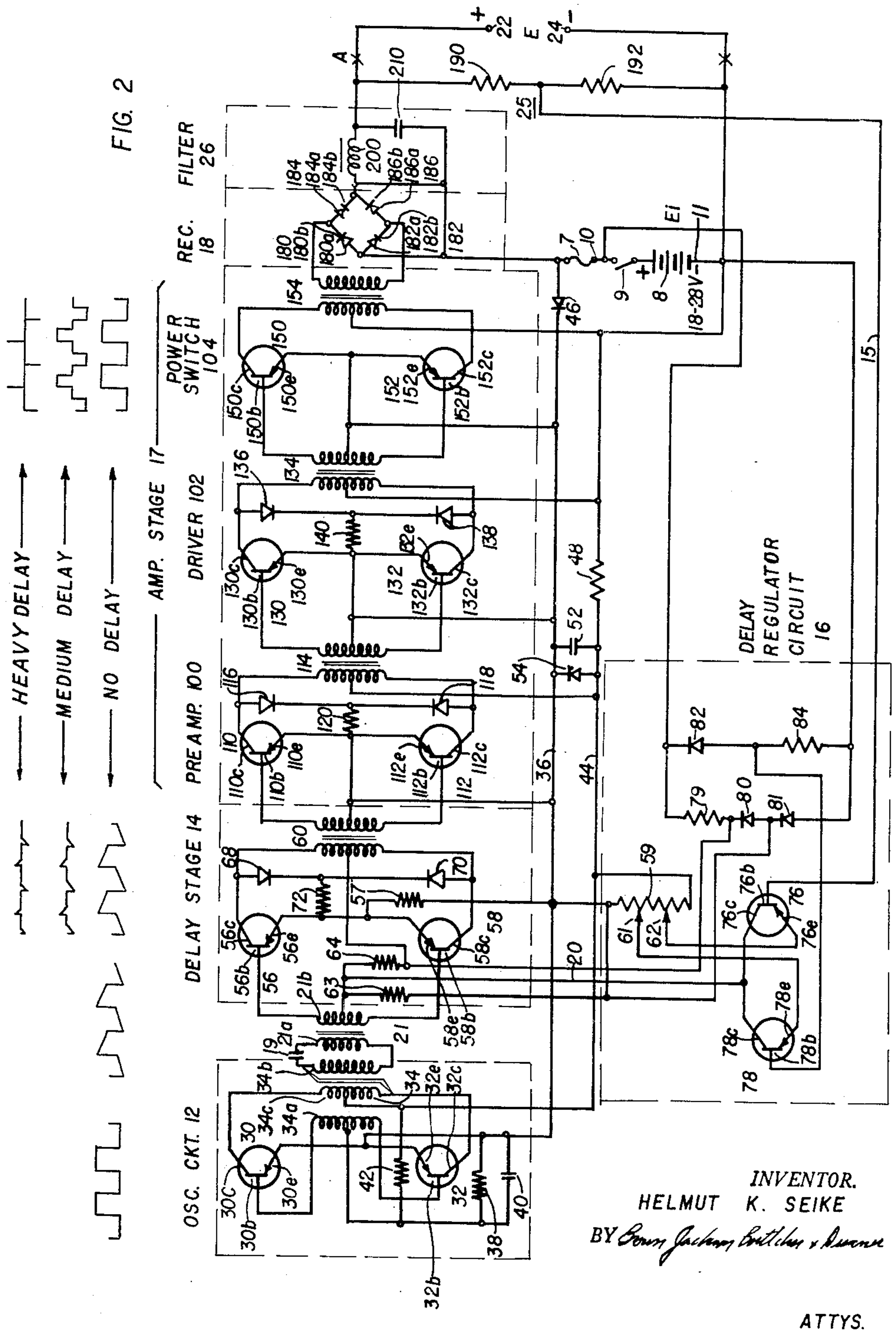
FIGURE 2 is a schematic diagram of a transistorized circuit of one of the preferred embodiments.

The present invention basically comprises a variable voltage supply source which includes an electronic oscillator circuit connected to be energized by the D.C. voltage of a supply source to produce a non-linear A.C.

waveform; a delay stage connected to the oscillator circuit to convert the nonlinear A.C. waveform to an A.C. pulse waveform output; means connected to the delay stage to amplify and rectify the output signals of the delay stage and to couple the signals serially with the voltage of the source to the load, and a delay regulator stage connected to sample the load and source voltages and to provide a control signal which varies the duty cycle of the delay stage (and thereby the time duration of the pulses output from the delay stage) in accordance with variation of the voltage level of the load and/or source. That is, if the load voltage is at the desired value, the sample signal will be of a value to decrease the duty cycle of the delay stage substantially to cut off. As a slight variation occurs in the load voltage from the given output, the delay stage output pulses, which are added to the source output, will be of a relatively small value. As the output of the load decreases (as for example, with the occurrence of a decrease in the source voltage, and/or a change in the load demand), a corresponding change will be detected by the delay regulator, and the duty cycle of the delay stage will be increased by a relative mount to thereby effect the addition of a signal output which as combined with the supply voltage provides the desired voltage in the output circuit. In a preferred embodiment, the delay regulator also includes means for sampling the source potential, and further modulates the width of the output pulses whenever the value of the source varies from a predetermined fixed value. Thus, the variation of the duty cycle in the present arrangement is basically derived by pulse modulation techniques, and particularly by varying the duration of the pulse output of the delay stage prior to the amplification and addition thereof to the output of the variable supply source.

The accurate provision of pulse modulation is attained by periodically providing a sloping waveform and coupling such waveform to the delay stage. A reference signal applied to the delay stage is then varied to regulate the bias potential at which the delay stage is operated. Such operation manifestly varies the effective portion of the sloping waveform during which an output signal is translated from the delay stage, for as the bias level is varied, the point at which the sloping waveform intersects the variable bias level is likewise displaced. Accordingly the duty cycle of the delay stage and thus of the inventive arrangement is varied in a positive and highly accurate manner.

The novel arrangement is especially efficient in its operation in that not only is a fraction of the total power produced by the pulse generator means of the inverter, but further the generator means are operative during only a fraction of each cycle. As a result only a portion of the output power is subject to the power loss of conversion (i.e., the additive output of the oscillator and delay stage), and the electronic means of the amplifier circuit are dissipating power as heat during only a fraction of the operational time of the converter. Other novel feature will be apparent from the following, more detailed description of one specific embodiment thereof.

Referring to FIGURE 1, the basic circuit of a preferred embodiment of the present invention is disclosed thereat, and as there shown the converter device basically comprises a switch 9 for connecting a pair of terminals 10, 11 to a fluctuating D.C. supply source 8, which is schematically represented thereat as being variable between, for example, 18–28 volts; a voltage booster circuit comprising an oscillator circuit 12 coupled to input terminals 10, 11 and operative to produce a non-linear A.C. output signal in response to the coupling of a D.C. voltage thereto, and a delay stage 14 coupled to oscillator circuit 12 for modulating the A.C. output signal thereof to produce a correction signal having an A.C. pulse waveform; a delay regulator circuit 16 connected to a sampling circuit including a Zener diode 82 and a resistor 84 to sense the voltage level of source 8, and also connected over conductor 15 to a sampling circuit 25 which senses the voltage level of the output signal, the delay regulator circuit 16 being operative to provide a control signal over conductor 20 to the delay stage 14 which is related to both the source and load voltage levels and which controls the time duration of the A.C. output pulses of the oscillator circuit 12 which are coupled to the succeeding amplifier stage 17 by delay stage 14, and a rectifier circuit 18 which converts the A.C. correction signal, as amplified, to a D.C. correction signal, and adds such correction signal to the output of the supply source 8 whereby an output power signal of a constant value will appear consistently across the output terminals 22, 24 of the device.

The regulation of the voltage level of the output power signal may be further improved by including a filter circuit means in the circuit of the improved converter, the output power signal of the rectifier 18 in such arrangement being coupled through a filter circuit 26 to the output terminals 22, 24. Other means for further modifying the operation of the improved converter—such as regulator circuits, voltage or current overload protector circuits, etc., may also be added for specific installations which may require such manner of control without departing from the spirit and scope of the invention.

In operation, the sampling circuit 25 provides a sample signal derived from the load to the delay regulator circuit 16, which also senses the voltage of source 8 over sampling circuit 82, 84, and applies a control signal to delay amplifier 14 which is related to the value of the sampled signals. The amount of the non-linear A.C. signal which will be amplified by delay amplifier 14 is dependent upon the value of the control signal from the regulator 16.

Thus, a decrease in the load voltage value and/or in the source voltage value will result in the amplification of an increased portion of each oscillator output pulse by the delay stage 14, and the consequent provision of pulse waveforms by the delay stage 14 of greater width or time duration. Since the power output is determined by $P=EI$ and the increased duty cycle of each pulse results in an increased current to satisfy the load demand, the value of the voltage will manifestly increase toward the desired predetermined value as pulses of increased duration are superimposed with the supply source output to provide the power for the load. As the output voltage is thus increased to the value of the desired voltage, the regulator circuit 16 controls the delay stage 14 to amplify a correspondingly reduced portion of each output wave of the oscillator circuit to thereby provide output pulses of a reduced width to thereby provide the desired voltage value in the output circuit.

As shown in more detail hereinafter, the provision of a pulse modulation network to vary the output signals to the load voltage achieves the desired regulation of the load without subjecting the transistors of the power amplifier circuits to serious overload conditions while yet providing a unit in which increased power output is provided. That is, one possible method of varying the load voltage comprises comparing a sampled load voltage with a reference voltage and controlling the transistors of the amplifier section to vary the amplitude of the output waves in accordance with said difference to maintain a constant voltage for the load. However, in such arrangement the transistor members in certain portions of the range would not be operated in their so-called saturated condition, and as is well known in the art, would not be capable of providing maximum power output, and in fact might be subject to severe damage by reason of such manner of operation.

Summarily since the power output of each pulse is determined by the envelope EI, variation of the width of the pulses will provide the necessary changes in the output power and the transistor members in the amplifier may be operated in the saturated condition at all times to provide maximum power output. Stated in another way, the booster unit provides output pulses of variable widths, the variable widths of the pulses being related to the variable power demands of the load whereby the amplitude of the pulses in the power amplifier section of the inverter may be maintained at a value throughout the operating range of the device which insures operation of the power transistors in the saturation state in each operation thereof. In that the power demands of the load are satisfied by the changing pulse width (or duty cycle), a constant voltage will be provided in the load independent of the variation of the source voltage or load changes.

In the embodiment of FIGURE 1 both a closed loop and an open loop correction network are employed; both the load and the source voltages are sensed to provide a correction signal which achieves the desired pulse modulation and duty cycle variation. The arrangement may also be connected only as an open loop correction network in which the sampling circuit derives a signal across the source terminals. As shown in FIGURE 1A, in such arrangement the sample signal derived at the junction of Zener diode 82 and resistor 84 is applied to delay regulator 16, and a correction signal of a related value is coupled to the delay stage 14 to effect a corresponding change in the width of the pulse output of the delay stage 14, and the resultant provision of compensatory signals which as amplified by stage 17 and combined with the source output by rectifier 18 provide the desired compensated voltage at the output terminals 22, 24.

It is evident that circuits for controlling delay regulator circuit 16 only in accordance with output or load voltage fluctuations are readily provided, as for example, by removing the input voltage sensing circuit 82, 84 from FIGURE 1.

*Specific circuit description*

With reference to FIGURE 2, the circuit of one specific design of a preferred embodiment is there shown in detail. As noted heretofore, the novel static converter basically comprises an oscillator circuit 12, a delay stage 14, a delay regulator circuit 16, a sampling circuit 25, means for sensing the source voltage, an amplifying stage 17, a rectifier circuit 18, and a filter circuit 26, the converter unit being operative to provide a compensating signal which as added to the output of the supply source results in an output signal of given constant value. A switch 9 is operative as closed to couple power to the positive and negative supply conductors 36, 44 for the device. The positive conductor 36 is coupled over a rectifier diode 46 to the positive terminal 10 of source 8, and negative conductor 44 is coupled over a resistor 48 to the negative terminal 11 of source 8. Diode 46 provides polarity protection; if the polarity of source 8 were reversed by accident, no potential would appear across the transistors in the inverter. Zener diode 54 and resistor 48 are connected so that the break-down voltage of diode 54 is exceeded thus providing a constant voltage for operation of stages 12, 14, 16 and 100. Capacitor 52, connected in parallel with diode 54, has a lower impedance than does the diode and thus protects diode 54 against A.C. components which may appear on conductors 36 and 44.

*Oscillator circuit 12*

As shown in FIGURE 2, oscillator circuit 12 is connected to supply conductors 36, 44 for energization thereby and basically comprises a first and a second transistor 30, 32, each having a base electrode **30*b*, 32*b*, collector electrode 30*c*, 32*c*, and an emitter electrode 30*e*, 32*e*, respectively, the transistors 30, 32 being connected in a self-oscillation circuit to continually generate square wave output signals for coupling over a three-winding transformer 34 to a differentiator 13**.

More specifically, emitter electrodes **30*e*, 32*e*, of transistors 30, 32 are connected together, and their common point is connected to positive supply conductor 36**.

The base electrodes **30*b*, 32*b* are coupled to opposite sides of the feedback winding 34*a* of transformer 34, and from the center tap thereon over the parallel combination of a resistor 38 and a capacitor 40 to positive supply conductor 36, and also from the center tap over a resistor 42 to negative supply conductor 44. The collector electrodes 30*c*, 32*c* are coupled to opposite sides of primary winding 34*c* on transformer 34 and from its center tap to negative supply conductor 44. Primary winding 34*c* and feedback winding 34*a* are magnetically coupled to a common flux path in the transformer 34** so that an excitation in one winding induces an excitation in the other winding.

The output signal of oscillator circuit 12, as shown in FIGURE 3, comprises a substantially square wave signal, the frequency of which is determined by the number of turns in the primary winding **34*c*, the supply voltage, and the saturation flux of the core of the transformer 34. Resistors 38 and 42, series-connected between positive conductor 36 and negative conductor 44**, produce a forward bias voltage in the oscillator circuit to enable this circuit to begin oscillating when the inverter is turned on.

Oscillator circuit 12 provides a square wave output, but in actual practice it is desirable to modify the output waveform shown in FIGURE 3 to provide the desired control signal for delay stage 14, which permits regulation of the time delay period in stage 14 responsive to a signal received from delay regulator circuit 16. Accordingly a differentiator 13 is coupled between oscillator circuit 12 and delay stage 14. The differentiator includes a capacitor 19 connected between primary winding **21*a* of coupling transformer 21 and secondary winding 34*b* of three-winding transformer 34. Differentiator 13 operates upon the square wave signal applied thereto (FIGURE 3) to produce, in a well known manner, a voltage having a sawtooth or sloping waveform (FIGURE 4). The manner in which such waveworm is utilized in delay stage 14** to provide delay periods, and thereby regulation of the power output, is described in more detail hereinafter.

*Delay stage 14*

Delay stage 14 is coupled to the output side of differentiator 13 to amplify selected portions of the continuous sawtooth wave output of oscillator circuit 13, and to couple the selected amplified portions thereof over a coupling transformer 60 to amplifier stage 17, the portion of each wave to be selected for amplification being determined by the delay regulator 16.

Delay stage circuit 14 basically comprises a pair of transistors 56, 58, each having a base electrode **56*b*, 58*b*, a collector electrode 56*c*, 58*c*, and an emitter electrode 56*e*, 58*e*, respectively, interconnected in a push-pull "grounded-emitter" amplifier arrangement, and coupled over transformer 21 to be driven by the output wave of differentiator 13. Base electrodes 56*b*, 58*b* of transistors 56, 58 are connected to opposite sides of the secondary winding 21*b* of transformer 21. The center tap on the secondary winding 21*b* is coupled over conductor 20 to delay regulator circuit 16, to receive therefrom a control signal which regulates the effective bias level of transistors 56 and 58 in delay stage 14. Emitters 56*e* and 58*e* of PNP type transistors 56 and 58 are connected to a common point, and over resistor 57 to positive conductor 36. The common point is also connected over a resistor 72 to the common connection of a pair of rectifiers 68 and 70, which are in turn connected between collectors 56*c* and 58*c* in opposed conducting relation. Rectifiers 68 and 70, and resistor 72, provide clipping for the transient voltages or "back-spikes" of potential which occur at the moment when one of transistors 56 and 58 is cut off and the other transistor has not commenced to conduct. Without such back-spike protection, a spurious output signal might be transmitted across transformer 60 and trigger the following stage. The collectors of transistors 56 and 58 are coupled to opposite terminals of the primary winding of transformer 60, the secondary winding of which is coupled to preamplifier circuit 100 of amplifier stage 17**.

Resistors 63 and 64 form a series-connected voltage divider arrangement, the divider being connected in parallel with Zener diode 80; thus the total voltage appearing across resistors 63 and 64 is maintained constant. The center tap of secondary winding 21*b* is connected to the junction of resistors 63 and 64, and the load terminals of secondary winding 21*b* are connected to bases 56*b* and 58*b*. This connection of the center tap to the voltage divider arrangement including resistors 63 and 64 biasses bases 56*b* and 58*b* negative relative to the emitters 56*e* and 58*e*, which are connected over resistor 57 to positive conductor 36. As a result, absent any signal from delay regulator circuit 16 over conductor 20 to bases 56*b* and 58*b*, the forward bias provided by the above-described circuits in delay stage 14 is sufficient to permit transistors 56 and 58 to conduct alternately as the successive half-cycles of the output signal from the oscillator circuit are applied to the bases thereof.

The output signal from delay stage 14 under these conditions is a full square wave signal such as that shown as the oscillator output signal in FIGURE 3 of the drawings. This occurs because the forward bias is positioned to cause stage 56, for example, to conduct immediately as the leading edge of the waveform shown in FIGURE 4 is applied to base 56*b* and to permit conduction of the transistors at saturation level during the entire duration of the waveform slope. Thus referring to line A (FIGURE 4), even though the signal translated across transformer 21 decays, as shown by the sloping crest of the waveform, the forward bias established by the above-described circuits is at level A and at the end of the decay time the transistor is still saturated.

As the applied sawtooth voltage now reverses polarity, transistor 56 is cut off and transistor 58 is switched on, providing a full square wave output from the inverter. The operation of this circuit as the forward bias voltage in the emitter-base circuit is altered in response to a signal from delay regulator circuit 16 will be described hereinafter.

Summarily, absent a control signal from the regulator circuit 16, full cycle pulses are generated by delay stage 14 and coupled over the succeeding stages to boost the output of the inverter.

*Delay regulator circuit 16*

Regulator circuit 16, although illustrated and described as a single circuit in connection with the general showings of FIGURES 1 and 1A, actually comprises two separate and independent transistor regular arrangements. The two regulators, however, have a common output circuit over conductor 20 to adjust the bias, and hence the time delay, in delay stage 14. The first regulator, including a PNP type transistor 76, is controlled by a voltage applied over conductor 15 to base 76*b*. This voltage is provided by sampling circuit 25 which is connected to sense the voltage changes across output terminals 22 and 24. Manifestly an increase in potential could occur at these terminals either from reduced load requirements and hence an increase in the apparent output voltage, or an increase in the supply voltage provided by battery 8. Accordingly it would appear that a single closed loop regulator circuit including only transistor 76 is sufficient to provide an output potential at terminals 22 and 24 which is stabilized irrespective of load variations and/or fluctuations in the supply voltage of battery 8. It was found, however, that in certain applications there may be a tendency for the complete system to produce parasitic oscillations when such compensation for both the source and the load fluctuations is effected over the same closed loop. In such instances, a PNP type transistor regulator 78 is provided and connected in an open loop circuit to provide a signal to delay stage 14 indicative only of fluctuations in the voltage of battery 8. In this manner, as will be more fully described hereinafter, the use of the two loops provides a stable and well-regulated system under even the most severe operating conditions.

In the open loop circuit, or the regulator arrangement including transistor 78, a sampling circuit including a Zener diode 82 and a resistor 84 is connected across the terminals of battery 8. A constant voltage drop appears across diode 82, and thus any fluctuation in the potential of battery 8 appears across resistor 84 and is applied over the direct connection to base 78*b* of transistor regulator 78. Emitter 78*e* of this transistor is connected to movable arm 61 of potentiometer 59, which is connected between positive conductor 36 and negative conductor 44. The setting of movable arm 61 is adjusted to a voltage level such that transistor 78 is cut off so long as a low potential appears at the terminals of battery 8. As the battery voltage increases, the potential translated from the junction of diode 82 and resistor 84 increases in a negative direction and this is applied to the base of transistor 78, causing a collector current to flow from 78*c* through resistor 64 to negative potential. This increased drop across resistor 64 changes the ratio of voltage drops which previously appeared across resistors 63 and 64, although the total voltage drop across these resistors remains the same. That is, the drop across resistor 64 increases, and the drop across resistor 63 decreases; thus the potential at the junction of resistors 63 and 64 becomes less negative (or increases in the positive direction), and this more positive potential is applied to bases 56*b* and 58*b* of delay stage transistors 56 and 58. Accordingly the forward bias of delay stage 14 is reduced, and the conduction period of this stage is decreased. Such a reduction of the conductive period is also referred to hereinafter as an increase of the delay time in delay stage 14. Such reduced conduction time is illustrated graphically in FIGURE 4, where the reduced forward bias, indicated by voltage level B, is shown intersecting the sloping portion of the waveform output across transformer 21. Because of the decrease in forward bias, transistors 56 and 58 are cut off before the expiration of a full half-cycle of the signal from oscillator 12. Under such conditions delay stage 14 passes a signal as shown in FIGURE 5B which, after subsequent passage through the saturated stages of amplifier 17, emerges as a square wave signal of reduced pulse width or reduced duty cycle. As will be more fully described hereinafter, such reduction of the duty cycle effects a corresponding reduction in the booster voltage which is added to the source voltage for energizing the load.

As the battery potential appearing across battery 8 rises even farther, the current from collector 78*c* also continues to rise and provides an even larger potential drop across resistor 64, reducing the forward bias of transistors 56 and 58 until there is little conduction of, or a heavy delay in, these stages. Such a reduced forward bias (or increased back bias) level is indicated by line C in FIGURE 4. Under these conditions delay stage 14 may pass a signal of the form shown in FIGURE 6A which, after passage through the saturated amplifier stages may resemble a pulse of voltage as shown in FIGURE 6B. Thus, as the requirement for supplementing the potential of battery 8 decreases, the signal passed from amplifier 17 to rectifier circuit 18 is gradually decreased from a full square wave such as that shown in FIGURE 3, to one such as that shown in FIGURE 5B as the battery potential rises farther, until ultimately only pulses of the form shown in FIGURE 6B are present when the battery voltage is near its maximum level.

The second regulator including transistor 76 functions in an analogous manner. Base 76*b* receives a signal from circuit 25 over conductor 15 which indicates fluctuation in the output voltage at terminals 22 and 24. Emitter 76*e* is connected to movable arm 62 of potentiometer 59. The setting of arm 62 is such that, when the load is heavy and the terminal voltage at terminals 22 and 24 is low, transistor regulator 76 is cut off and provides no collector current from collector 76c over resistor 64 to negative potential. As the load requirements diminish and the output potential at terminals 22 and 24 begins to rise, the potential at base 76b increases in a negative direction and turns on transistor 76. Accordingly current from collector 76c flows over resistor 64 to change the ratio of the voltage drops across resistors 63 and 64 in a manner already described, decreasing the forward bias of the transistors in delay stage 14 and causing an increased time delay or reduced (in width) pulse output of this stage.

As noted above, the use of two sensor devices 76, 78 is desirable in certain applications, to minimize the possibility of oscillatory conditions which may occur if only one sensor device is used in a closed loop circuit. In the present arrangement, the sensor circuit including transistor 78 is set by adjustment of arm 61 on potentiometer 59 to a voltage level such that transistor 78 is just at the conductivity threshold when the potential of the source 8 is at a minimum value and the delay stage 14 is then at full duty cycle. As soon as the voltage of source 8 rises, transistor 78 conducts to reduce the duty cycle, and as the input voltage approaches maximum value, transistor 78 provides substantially maximum delay in delay stage 14.

The sensor circuit including transistor 76 is adjusted by the setting of arm 62 of potentiometer 59 to a voltage level such that transistor 76 is backbiassed, and thus nonconductive, when the voltage at terminals 22 and 24 is at a minimum value. As such terminal voltage increases responsive to diminishing load requirements, an increasing signal is provided from transistor 76 to delay stage 14 to gradually decrease the duty cycle of the delay stage.

Thus the first sensor circuit, including transistor 78, is connected so that fluctuations in the voltage level of source 8 which may occur for any reason, including a change of battery, are substantially compensated by operation of the first sensor circuit in regulating delay stage 14 to provide the required booster voltage. Accordingly the closed loop sensor circuit including transistor 76, which senses the output terminal voltage, need provide only a small part of the regulation required by source voltage fluctuations. As noted above, such an arrangement minimizes oscillations which might otherwise occur as the output terminal voltage approaches the desired value, thus providing a more stable system.

*Amplifier stage 17*

The modulated pulse-width signal output of delay stage 14 is coupled to the succeeding amplifier stage 17 including amplifier circuits 100, 102 and 104, and thence to rectifier circuit 18 to produce therein a rectified pulse waveform having a direct current value of a magnitude which when combined with the source output provides an output voltage of a predetermined value.

More specifically, preamplifier circuit 100 of the amplifier stage is connected between delay stage 14 and drive amplifier circuit 102 to amplify the pulse wave output of delay stage 14 and to couple such signals to drive amplifier circuit 102, and in such connection serves to provide isolation for the delay stage 14 so that heavy loading of the power amplifier circuit 102 does not affect the sensitive bias settings in delay stage 14, and further serves to reduce the rise and fall times of the output signal of delay stage 14. The provision of a similar rise and fall time, in turn, reduces heating in the power amplifier circuit 104.

Preamplifier circuit 100 basically comprises a pair of transistors 110, 112, each having a base electrode **110*b*, 112*b*, a collector electrode 110*c*, 112*c*, and an emitter electrode 110*e*, 112*e*, respectively, connected in a push-pull amplifier arrangement. The output of delay stage 14 is coupled over the coupling transformer 60 to the base electrodes 110*b*, 112*b* of transistors 110, 112 which are coupled to opposite sides of the secondary winding of the coupling transformer 60, and over the center tap of transformer 60 to the positive supply conductor 36. The emitter electrodes 110*e*, 112*e* are connected together and the common point is also coupled directly to the positive supply conductor 36. The collector electrodes 110*c*, 112*c* are coupled to opposite sides of the primary of the coupling transformer 114, the center tap of which is coupled to the negative supply conductor 44, and the output of the preamplifier circuit 110 which appears at the collector electrodes 110*c*, 112*c* is thus coupled to the primary winding of coupling transformer 114**.

Each of the collector electrodes **110*c*, 112*c* is also coupled over a diode 116, 118 and a common resistor 120 to the common point connecting the emitter electrodes 110*e*, 112*e*. As discussed hereinbefore in relation to the circuitry of the delay stage 14 these diodes 116, 118 provide despiking of the output waveform of the transistors 110, 112, allowing the use of coupling transformers. Such use permits better matching, greater efficiency, and provides faster rise and fall times in the output waveform of preamplifier circuit 100**.

In operation, the modulated pulse wave output of delay stage circuit 14 is coupled over coupling transformer 60 of amplifier stage 17 to the base electrodes **110*b*, 112*b* of the transistors 110, 112 which operate to provide an amplified pulse wave output over the collector electrodes 110*c*, 112*c*, and the coupling transformer 114 to the driver amplifier circuit 102. The amplification of the pulse waveform by preamplifier circuit 100 does not affect the duration of the modulated pulses, and therefore does not affect the correction signal regulation as determined by regulator circuit 16 and delay stage 14**.

Driver amplifier circuit 102 is connected between preamplifier 100 and power amplifier circuit 104 to provide a pulse wave signal to the power amplifier circuit 104 which is of sufficient power and amplitude to drive the transistors of the power amplifier circuit 104 to saturation in response to the application of a pulse signal from preamplifier circuit 100 to the driver amplifier circuit 102.

Driver amplifier circuit 102 comprises a pair of transistors 130, 132, each having a base electrode **130*b*, 132*b*, a collector electrode 130*c*, 132*c*, and an emitter electrode 130*e*, 132*e*, respectively, connected in a push-pull amplifier arrangement, and driven by the pulse waveform output of preamplifier circuit 100 which is coupled to the base electrodes 130*b*, 132*b* by the secondary of coupling transformer 114. More specifically, the base electrodes 130*b*, 132*b* of the transistors 130, 132 are connected to opposite sides of the secondary winding of the coupling transformer 114, the center tap of which is coupled over diode 46 to the positive input terminal 10. The emitter electrodes 130*e*, 132*e* are connected together, and the common point is also coupled to the positive supply conductor 36. The collector electrodes 130*c*, 132*c* are coupled to opposite sides of the primary of coupling transformer 134, the center tap of which is connected to the negative input terminal 11**.

Each of the collector electrodes **130*c*, 132*c* is also coupled over a diode 136, 138 and a common resistor 140 to the common point connecting the emitter electrodes 130*e*, 132*e*. These diodes provide despiking of the output waveform of the transistors 130, 132**, allowing the use of coupling transformers, and the advantages derived therefrom.

In operation, the pulse wave output of preamplifier circuit 100 is coupled over the coupling transformer 114 to the base electrodes **130*b*, 132*b* of the transistors 130, 132, which operate to provide an amplified pulse wave output over the collector electrodes 130*c*, 132*c* and the primary of coupling transformer 134 to the power amplifier circuit 104. The amplification of the pulse waveform by driver amplifier circuit 102 does not affect the duration of the pulses, and therefore does not disturb the pulse-width of the regulated signal as determined by delay stage 14 and regulator circuit 16**.

Power amplifier circuit 104 is connected between driver amplifier circuit 102 and rectifier circuit 18 and is operative in response to the receipt of modulated pulse waveform signals from driver amplifier 102 to provide to rectifier circuit 18, power correction signals which are comprised of pulses of a modulated duration.

More specifically, power amplifier 104 comprises a pair of power transistors 150, 152 each having a base electrode 150*b*, 152*b*, a collector electrode 150*c*, 152*c*, and an emitter electrode 150*e*, 152*e*, respectively, connected in a push-pull amplifier arrangement, the base electrodes 150*b*, 152*b* of the transistors 150, 152 being connected to opposite sides of the secondary winding of coupling transformer 134, and over the center tap and diode 46 to the positive input terminal 10. The emitter electrodes 150*e*, 152*e* are connected together and the common point is also coupled over diode 46 to the positive input terminal. The collector electrodes 150*c*, 152*c* are coupled to opposite sides of the primary winding of coupling transformer 154, the center tap of which is connected to the negative input terminal 11.

In operation, the modulated pulse waveform output of driver amplifier circuit 102 is coupled over the coupling transformer 134 to the base electrodes 150*b*, 152*b* of the power transistors 150, 152, which operate to provide a power pulse waveform signal over the collector electrodes 150*c*, 152*c* and over coupling transformer 154 to the rectifier circuit 18, which signals are of sufficient power and amplitude, when rectified, to compensate for the divergence between the output voltage E at terminals 22, 24 and the voltage desired. The input pulses from driver amplifier circuit 102 alternately drive each power transistor 150, 152 to saturation. Therefore, the power pulses produced by power amplifier circuit 104 and coupled to the rectifier circuit 18 are all of the same amplitude, regardless of their duration.

The only variable in the power pulse waveform output of power amplifier circuit 104 is the duration of the modulated pulses, which is determined by the delay stage 14 as controlled by the regulator circuit 16. Since the amplification of the pulse waveform correction signal by the preamplifier circuit 100, driver amplifier circuit 102 and power amplifier circuit 104 does not lengthen or shorten the duration of the modulated pulses, the pulse-width modulation determined by delay stage 14 and regulator circuit 16 is not affected by the amplification thereof in the circuits 100, 102, 104.

*Series additive rectifier circuit*

The rectifier circuit 18 is connected between the source terminals 10, 11 and the output terminals 22, 24 and between the power amplifier circuit 104 and filter circuit 26 for combining the voltages coupled thereto from both source 8 and the power amplifier circuit 104 to produce a constant D.C. voltage signal output for coupling over the filter circuit 26 to the load.

More specifically, the rectifier circuit 18 comprises a set of four diodes 180, 182, 184, 186, each having an anode 180*a*, 182*a*, 184*a*, 186*a*, and a cathode 180*b*, 182*b*, 184*b*, 186*b*, respectively, connected in a bridge rectifying circuit for serially combining the D.C. output from source 8, and the rectified A.C. square wave output signals of the coupling transformer 154, to provide a D.C. output power signal to the filter 26 which is of a constant value.

The anodes 180*a*, 182*a*, of the first two diodes 180, 182 are coupled together, and the common point connected to the positive input terminal 10, and cathodes 180*b*, 182*b* are each connected to an anode 184*a*, 186*a* of one of the second two diodes 184, 186, the common points being connected to opposite ends of the secondary winding of the coupling transformer 154 to receive the modulated pulse waveform correction signals from the power amplifier circuit 104. The cathodes 184*b*, 186*b* of the second two diodes 184, 186 are connected together and the common point coupled to the filter circuit 26. The diodes 180, 182, 184, 186 of bridge rectifier circuit 18 are of the silicon type to provide thermal stability, and it is apparent that any positive D.C. voltage signal appearing at the positive input terminal 10 is conducted over each of the diodes 180, 182, 184, 186, of the rectifier bridge circuit 18 to provide a positive output signal to the filter circuit 26. Also, each positive pulse signal from the power amplifier circuit 104 during which the top end of the coupling transformer 154 is positive, is conducted over diodes 182 and 184 to provide an additional positive output signal to the filter 26 which is superimposed upon the positive output signal source. Negative pulse signals, in which the lower end of the transformer 154 is positive, are conducted over diodes 180 and 186 to provide a signal to the filter circuit 26 during the second portion of each cycle of the oscillator 12 which is additive to the output signal of the source.

The rectifier circuit 18 is therefore operative to rectify the modulated pulse waveform signals received from power amplifier 104, and superimpose the rectified pulse waveform upon the D.C. source output.

*Filter circuit*

Filter circuit 26 is connected between rectifier circuit 18 and output terminals 22, 24 and is operative to minimize the ripple in the D.C. output signal caused by the rectified pulse waveform correction signal as superimposed on the D.C. input signal. The filter circuit 26 basically comprises a choke 200 and a capacitor 210 connected in an L-type filter circuit ot the rectifier output. The capacitor 210 which is connected across the output terminals of rectifier 18 offers a very high resistance to a D.C. power signal, but a low impedance path to an A.C. ripple signal so that the A.C. ripple signals are shunted through the capacitor 210, and do not appear across the output terminals 22, 24. The L-type filter provides a high output voltage at low current drain.

The filter passes a D.C. power signal which is equal to the input D.C. voltage plus the average voltage of the superimposed rectified modulated pulse waveform. Since the width of the modulated pulse varies to provide the variable power for the load demand, the D.C. component superimposed upon the fluctuating D.C. input voltage by the booster stage (oscillator circuit 12), delay stage 14, delay register 16, amplifier stage 17 and rectifier 18 will be of a value (in accordance with the ohmic law) which results in a constant voltage for the load independent of changes in the load demand.

Summarily the converter includes a sampling circuit 25 which provides a continuous indication to the regulator 76 within circuit 16 of the value of the output voltage (which may vary as the result of a change in the load or a change in the source voltage), and a continuous indication of the source voltage is applied to the other regulator 78 within circuit 16; regulator circuit 16 in turn generates a control signal to vary the width or duration of the output pulses which are generated by oscillator circuit 12 and coupled over the delay stage 14 to the amplifier stage 17 for addition to the source power. The positive D.C. additive signal which is superimposed upon the D.C. input signal of the source by reason of its modulated width satisfies both the changing power demands of the load, and variations of the source potential, and in accordance with the law $P=EI$, the output voltage is maintained constant in the output circuit and across the load.

*Conclusion*

Thus the improved static converter of the present invention provides a constant voltage D.C. output power signal, the voltage of which remains constant over a large range of input signal voltage fluctuations and output loading conditions, which has a minimum of superimposed A.C. ripple voltage, and which exhibits an extended useful life. Since transistors are utilized in the illustrated preferred embodiment, the converter is easily portable and capable of dependable operation under severe operating forces such as shock, vibration, and extreme temperature conditions.

Further, since the input voltage under normal conditions has a magnitude sufficient in itself to provide the desired output level, and the booster portion of the inverter is operative only when the voltage level falls beneath the predetermined value, the booster circuit is only operative for a relatively short portion of the usable time of the source and little power dissipation is experienced in such portion of the inverter circuit. In that only a part of the total output power signal is provided by the booster circuit when a variation from the desired level occurs, only a small part of the power output is subject to power dissipation in the signal transformation, and as a result, the efficiency of conversion of the total output power of the converter is higher than the efficiency of conversion generally experienced heretofore with known circuit designs. Manifestly by deriving a portion of the total output power directly from the source, the inverter can be made much smaller in size and may consist of lower power components of a reduced size.

It is apparent that this same principle of using the input signal directly as part of the output D.C. voltage signal may be used in a low voltage D.C. to high voltage D.C. conversion. Thus the illustrated embodiment may be used as a low to high voltage D.C. converter by including a stepup transformer in lieu of coupling transformer 154. In this embodiment also, only a part of the total output signal power is subject to the D.C. to A.C. square wave to D.C. signal transformation, and the efficiency of this type of converter is thereby increased. Further, such principle may be used in an arrangement in which the comparator means examine the output load for variation in value, as well as in arrangements in which the comparator means examine the value of the source signals.

It will also be apparent to those skilled in the art that additional protective circuitry may be added to the embodiment illustrated and described without departing from the spirit of the invention. Such additional circuitry may include: (1) further filter means to eliminate all A.C. ripple voltage from the output signal; (2) series regulator means for further regulating the output voltage to a more constant voltage level under varying load condions; (3) thermistor devices for preventing variations in the parameters of the circuitry by ambient temperature variations; and (4) overload protection means to interrupt or to change operation during the occurrence of a short circuit or overload conditions across output terminals 22, 24.

In a further modification of the arrangement, thermal sensing means, such as thermistors, may be connected to provide indications of unsafe ambient temperatures, mounting base temperatures, etc., and the resultant indications may be coupled to either one or both of the regulator circuits to control the output of the regulator circuit, and to effect a corresponding adjustment of the delay circuit to effect cut-off of the inverter device. Other similar modifications, and particularly modifications wherein the delay circuit output may be readily modified in response to the occurrence of any of a number of different predetermined conditions, will be apparent to parties skilled in the art.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. A static inverter device for providing a constant voltage output independent of variations in the source and load comprising an input circuit for coupling the inverter device to said source, pulse generator means for providing signal output pulses of variable widths, a regulator circuit including means connected to derive an error signal indicative of variations of the voltages of said source and of said load from predetermined values, means for coupling a control signal to said pulse generator means to modulate the width of the signal output pulses in accordance with the amount of variance from said values, an output circuit, and means for additively coupling the modulated pulse output of said pulse generator means and said source to said output circuit.

2. A static inverter device for providing a constant voltage output independent of variations in the source and load comprising an input circuit for coupling the inverter device to said source, pulse generator means for providing signal output pulses of variable widths, a regulator circuit including means connected to derive an error signal indicative of variations of the voltage of said load from a predetermined value, means for coupling a related signal to said pulse generator means to vary the width of the signal output pulses in accordance with the difference of said load voltage and said predetermined value, an output circuit, and means for additively coupling the modulated output of said pulse generator means and said source to said output circuit.

3. A static inverter device for providing a constant voltage output independent of variations in the source and load comprising an input circuit for coupling the inverter device to said source, pulse generator means for providing signal output pulses of variable widths, a regulator circuit including means connected to derive an error signal indicative of variations of the voltage of said source from a predetermined value, means for coupling a related signal to said pulse generator means to modulate the width of the signal output pulses in accordance with the difference between said predetermined value and said source voltage, an output circuit, and means for additively coupling the output of said variable source and the modulated output of said pulse generator means to said output circuit.

4. A static inverter device for providing a constant voltage output independent of variations in the voltage level of a connected load comprising pulse generating means including wave-shaping means for periodically providing a signal having a sloping waveform, switching means coupled to said pulse generating means for transmitting at least a portion of said waveform signals over an associated output circuit to said load, a regulator circuit including means connected to derive an error signal indicative of variations of the voltage level of said load from a predetermined value, and means for coupling a reference signal related to said error signal to said switching means to vary the point on said sloping waveform at which said switching means is rendered conductive to thereby modulate the width of the output pulses in accordance with the variation of the load voltage from the predetermined value and produce the supplemental voltage required to provide a constant voltage output.

5. A static inverter device for providing a constant voltage output independent of variations in the voltage levels of a connected source and load comprising an input circuit for coupling the inverter device to said source, wave-shaping means for periodically providing a signal having a sloping waveform, switching means coupled to said pulse generating means for transmitting at least a portion of said waveform signals over an associated output circuit to said load, a regulator circuit including means connected to derive an error signal indicative of variations of the voltage levels of said source and said load from predetermined values, means for coupling a reference signal related to said error signal to said switching means to vary the point on said sloping waveform at which said switching means is rendered conductive to thereby modulate the width of the output pulses in accordance with the variations of the load and source voltage levels from the predetermined values and produce the supplemental voltage required to provide a constant voltage output.

6. A static inverter device as set forth in claim 5 in which said oscillator circuit comprises a square wave oscillator circuit, and in which a differentiator is coupled between said oscillator circuit and said delay stage for modifying the wave shape of the output pulses of said oscillator circuit to provide a sloping waveform.

7. A static inverter device for providing a constant voltage output independent of variations in a connected source and load comprising an input circuit for coupling the device to said source, pulse generating means including pulse modulator means for providing signal output pulses of variable widths therefor, a regulator circuit means connected to derive an error signal indicative of variations of the voltages of said source and said load from predetermined values, means for coupling a control signal to said pulse modulator means to modulate the width of the signal output pulses, the control signal being of a value to effect a pulse output of decreased width responsive to the occurrence of a small variation from said values and of a large width responsive to the occurrence of a large variation from said values, an output circuit, and means for additively coupling the modulated output of said pulse generating means and said source to said output circuit.

8. A static inverter device as set forth in claim 7 which includes an amplifier stage connected between said pulse generating means and said output circuit comprising a first amplifier circuit operative as a buffer stage, a driver amplifier circuit, and a power amplifier circuit connected in series relation to amplify each pulse output of the pulse generating means prior to the coupling thereof to said output circuit.

9. A static inverter device for providing a constant voltage output independent of variations in the source and load comprising an input circuit for coupling the inverter device to said source, pulse generating means including a pulse generator circuit, a push-pull amplifier circuit connected to the output thereof, means for biasing said amplifier circuit to be conductive for the full duty cycle of each pulse output of said generator, a regulator circuit including means connected to derive an error signal indicative of variations of the voltages of said source and said load from predetermined values, means for coupling a control signal to said pulse generating means to effect modulation of the width of the signal output pulses in accordance with the difference of the voltages from said predetermined values, the control signal effecting decreased conduction time of said amplifier circuit whenever the difference is of a minimum value and a correspondingly increased conduction time when the difference is correspondingly large, an output circuit, and means for additively coupling the modulated output of said amplifier circuit and said source to said output circuit.

10. A static inverter device for providing a constant voltage output independent of variations in the source and load comprising an input circuit for coupling the inverter device to said source, pulse generating means including a pulse generator circuit, a push-pull amplifier circuit connected to the output thereof, means for biasing said amplifier circuit to be conductive for the full duty cycle of each pulse output of said generator, a regulator circuit including sampling means connected to derive an error signal indicative of variations of the voltages of said source and said load from predetermined values, means for coupling a control signal to said pulse generating means to effect modulation of the width of the signal output pulses in accordance with the difference of the voltages from said predetermined values, the control signal effecting decreased conduction time of said amplifier circuit whenever the difference is of a minimum value and a correspondingly increased conduction time when the difference is correspondingly large, an output circuit, rectifier means for additively coupling the modulated output of said amplifier circuit and said source to said output circuit, means for coupling the modulated output of said amplifier circuit to said rectifier means including a transformer coupling member connected to the output circuit of said amplifier, and diode means connected across the output circuit of said amplifier circuit in an opposing direction of conductivity to minimize the transient pulses which appear thereacross.

11. A static inverter device for providing a constant voltage output independent of variations in the source and load comprising an input circuit for coupling the inverter device to said source, pulse generator means for providing signal output pulses of variable widths, a regulator circuit including means connected to derive an error signal indicative of variations of the voltages of said source and said load from predetermined values, means for coupling a control signal to said pulse generator means to modulate the width of the signal output pulses in accordance with the variation of the voltages from said predetermined values, an output circuit, and means including a rectifier stage for rectifying the modulated pulse output of said pulse generator means and for additively coupling the rectified output of said rectifier stage with the source output to said output circuit.

12. An arrangement as set forth in claim 11 which includes a filter means connected between said rectifier means and said output circuit.

13. An arrangement as set forth in claim 11 which includes means for connecting a sampling means across a load in said output circuit, in which said regulator circuit includes reference means for establishing a fixed reference signal, and comparer means connected in said regulator circuit for comparing the output of said sampling means with said fixed reference voltage and providing said indicative error signal.

14. An arrangement as set forth in claim 11 which includes means for connecting a sampling means across said source, and in which said regulator circuit includes reference means for establishing a fixed reference signal, and comparer means connected in said regulator circuit for comparing the output of said sampling means with said fixed reference voltage and providing said indicative error signal.

15. A static inverter device for providing a constant voltage output independent of variations in a connected source and load comprising an input circuit for coupling the inverter device to said source for energization thereby, an output circuit for coupling the output of said inverter to said load, pulse generating means including means for providing signal output pulses of variable widths therefrom, a regulator circuit including sampling means connected to derive a signal indicative of the voltage of said output circuit, means for providing a reference signal indicating a desired predetermined voltage value for said output circuit, means for coupling a control signal to said pulse generator means to modulate the width of the signal output pulses in accordance with the difference between the voltage of the output circuit and said predetermined value, an output circuit, and means for additively coupling the modulated output of said pulse generating means and said source to said output circuit.

16. A static inverter device for providing a constant voltage output independent of variations in the source and load comprising: an input circuit for coupling the inverter device to said source; pulse generator means for providing signal output pulses of variable widths; a first means connected to derive a first error signal indicative of variations of the voltage of said source from a predetermined value and a second means connected to derive a second error signal indicative of variations of the voltage of said load from a predetermined value; regulator means including a first and a second regulator for coupling a control signal to said pulse generator means to modulate the width of the signal output pulses in accordance with the value of the first and second error signals; an output circuit; and means for additively coupling the modulated pulse output of said pulse generator means and said source to said output circuit.

17. A static power supply unit for selectively varying the value of the power output signals to a load in relation to the variation of a predetermined electrical characteristic, comprising: a plurality of switching stages including pulse generator means for providing signal output pulses of variable widths to said load; means including a regulator circuit connected to provide a control signal indicative of variation of said predetermined electrical characteristic from a predetermined value in said static power supply unit; and circuit means coupled between said pulse generator and said regulator circuit for applying a control signal to said pulse generator to modulate the width of the signal output pulses for said load in accordance with the amount of variation from said predetermined value.

18. A static power booster unit for selectively adding a signal of variable value to a reference signal derived from a source to provide an output signal of a predetermined value for a load, and for regulating said variable value signal as a function of the variation of a predetermined characteristic which is represented by an electrical signal, comprising: pulse generator means for providing signal output pulses of variable widths; delay means for modulating the width of the output signal pulses; means connected to provide an error signal indicative of variation of said predetermined characteristic from a predetermined value; a regulator circuit for providing a control signal to said delay means to modulate the width of the signal output pulses in accordance with the amount of variation from said predetermined value; means for providing a reference signal for said source; and output circuit means coupled to said pulse generator means for adding said output pulses to the source reference signal for application to said load.

No references cited.